(12) United States Patent
Lee

(10) Patent No.: US 9,228,632 B2
(45) Date of Patent: Jan. 5, 2016

(54) DAMPING FORCE VARIABLE SHOCK ABSORBER HAVING ADDITIONAL VALVE INSTALLED IN ROD GUIDE

(71) Applicant: MANDO CORPORATION, Pyeongtaek-si, Gyeonggi-do (KR)

(72) Inventor: Kwang Su Lee, Suwon-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/276,161

(22) Filed: May 13, 2014

(65) Prior Publication Data

US 2014/0339033 A1 Nov. 20, 2014

(30) Foreign Application Priority Data

May 14, 2013 (KR) .......................... 10-2013-0054244

(51) Int. Cl.
*F16F 9/50* (2006.01)
*F16F 9/512* (2006.01)

(52) U.S. Cl.
CPC ............... *F16F 9/512* (2013.01); *F16F 9/5126* (2013.01)

(58) Field of Classification Search
USPC ......................... 188/266.6, 313, 315, 322.13, 188/322.16–322.18, 322.2
See application file for complete search history.

(56) References Cited

U.S. PATENT DOCUMENTS

| | | | | | |
|---|---|---|---|---|---|
| 3,268,037 | A | * | 8/1966 | Von Lowis Of Menar ... | 188/313 |
| 4,312,499 | A | * | 1/1982 | Wossner et al. ............... | 267/226 |
| 5,363,945 | A | * | 11/1994 | Lizell et al. .................... | 188/281 |
| 5,522,486 | A | * | 6/1996 | Fulks et al. .................... | 188/315 |
| 7,216,747 | B2 | * | 5/2007 | Breese ........................... | 188/315 |
| 8,418,820 | B2 | * | 4/2013 | Kim ............................... | 188/284 |
| 2005/0178627 | A1 | * | 8/2005 | Lemmens et al. ........ | 188/322.17 |

* cited by examiner

*Primary Examiner* — Christopher Schwartz
(74) *Attorney, Agent, or Firm* — Hauptman Ham, LLP

(57) ABSTRACT

Provided is a damping force variable shock absorber in which an additional valve is installed in a rod guide so as to implement performance that could not be implemented by a main valve. The damping force variable shock absorber includes: a base shell in which a damping force variable valve assembly is attached to an outside thereof; an inner tube which is installed inside the base shell and in which a piston rod is installed to be movable in a length direction; a piston valve which is connected to one end of the piston rod to partition an internal space of the inner tube into a rebound chamber and a compression chamber; a separator tube which is installed to partition a space between the base shell and the inner tube into a low-pressure chamber and a high-pressure chamber.

5 Claims, 5 Drawing Sheets

DAMPING FORCE VARIABLE SHOCK ABSORBER HAVING ADDITIONAL VALVE INSTALLED IN ROD GUIDE

CROSS-REFERENCE(S) TO RELATED APPLICATION

This application claims priority of Korean Patent Application No. 10-2013-0054244, filed on May 14, 2013, in the Korean Intellectual Property Office, the contents of which are incorporated herein by reference in its entirety.

BACKGROUND OF THE INVENTION

1. Field of the Invention

The present invention relates to a damping force variable shock absorber having a damping force variable valve assembly, and more particularly, to a damping force variable shock absorber in which an additional valve is installed in a rod guide so as to implement performance that could not be implemented by a main valve.

2. Description of the Related Art

In general, a shock absorber is installed in means of transportation such as automobile or the like, and improves a ride comfort by absorbing and damping a vibration or shock from a road surface during driving.

Such a shock absorber includes a cylinder and a piston rod installed to be compressible and extendable within the cylinder. The cylinder and the piston rod are installed in a vehicle body, wheels, or axles.

A shock absorber, a damping force of which is set to be low, can improve a ride comfort by absorbing a vibration caused by unevenness of a rod surface during driving. On the contrary, a shock absorber, a damping force of which is set to be high, can improve a steering stability by suppressing a change in a posture of a vehicle body. Therefore, in a conventional vehicle, a shock absorber, to which a damping force characteristic is differently set, is applied according to the purpose of use of the vehicle.

Recently, there has been developed a damping force variable shock absorber in which a damping force variable valve capable of appropriately adjusting a damping force characteristic is mounted on one side of a shock absorber, such that a damping force characteristic is appropriately adjusted to improve a damping force a ride comfort or a steering ability according to a road surface and a driving condition.

FIG. 1 is a sectional view illustrating an example of a conventional damping force variable shock absorber. Referring to FIG. 1, the conventional damping force variable shock absorber 10 includes a base shell 12, and an inner tube 14 which is installed inside the base shell 12 and in which a piston rod 24 is installed to be movable in a length direction. A rod guide 26 and a body valve 27 are installed in an upper portion and a lower portion of the inner tube 14 and the base shell 12, respectively. In the inside of the inner tube 14, a piston valve 25 is connected to one end of the piston rod 24, and the piston valve 25 partitions the internal space of the inner tube 14 into a rebound chamber 20 and a compression chamber 22. A top cap 28 and a base cap 29 are installed in an upper portion and a lower portion of the base shell 12, respectively.

A reservoir chamber 30 is formed between the inner tube 14 and the base shell 12 to compensate for a change in a volume of the inner tube 14 according to a reciprocating motion of the piston rod 24. A flow of a working fluid between the reservoir chamber 30 and the compression chamber 22 is controlled by the body valve 27.

In addition, a separator tube 16 is installed inside the base shell 12. Due to the separator tube 16, the inside of the base shell 12 is partitioned into a high-pressure chamber PH connected to the rebound chamber 20, and a low-pressure chamber PL serving as the reservoir chamber 30.

The high-pressure chamber PH is connected to the rebound chamber 20 through an inner hole 14a of the inner tube 14. Meanwhile, the low-pressure chamber PL is connected to the compression chamber 22 through a lower passage 32 formed between a body of a body valve 27 and the base shell 12 (or the base cap 29) and a passage formed in the body valve 27.

Meanwhile, the conventional shock absorber 10 includes a damping force variable valve assembly 40 mounted on one side of the base shell 12 so as to vary a damping force.

The damping force variable valve assembly 40 is provided with oil passages connected to a base shell 12 and a separator tube 16 and communicating with the high-pressure chamber PH and the low-pressure chamber PL, respectively. In addition, the damping force variable valve assembly 40 includes a spool 44 installed to be moved by a driving of an actuator 42. An inner passage communicating with the high-pressure chamber PH and the low-pressure chamber PL is varied by a movement of the spool 44, and a damping force of the shock absorber 10 is varied accordingly.

However, the conventional damping force variable shock absorber could not perform a frequency selective function or an amplitude selective function that adjusts a damping force according to a frequency or amplitude of an input shock, and could not generate a damping force when a working fluid inside the shock absorber flows at an extremely low speed. Therefore, in designing a damping force variable shock absorber, there is a need to continuously conduct research and development on methods capable of selectively mounting an amplitude selective valve, a frequency selective valve, and an extremely-low-speed valve on a damping force variable shock absorber according to a vehicle type to be applied.

SUMMARY OF THE INVENTION

The present invention has been made in an effort to solve the above problems and is directed to provide a damping force variable shock absorber, in which an additional valve is designed to be selectively mounted for providing a frequency or amplitude selective function, which could not be implemented by a conventional damping force variable shock absorber, or generating a damping force at the time of an extremely low speed, the additional valve and a damping force variable valve are installed on a serial passage so as not to affect the operation of the damping force variable valve, and a spatial limitation is solved by installing the additional valve within a rod guide.

According to an aspect of the present invention, a damping force variable shock absorber includes: a base shell in which a damping force variable valve assembly is attached to an outside thereof; an inner tube which is installed inside the base shell and in which a piston rod is installed to be movable in a length direction; a piston valve which is connected to one end of the piston rod to partition an internal space of the inner tube into a rebound chamber and a compression chamber; a separator tube which is installed to partition a space between the base shell and the inner tube into a low-pressure chamber and a high-pressure chamber; and an additional valve which is installed inside a rod guide installed to close an upper opening of the base shell.

The additional valve and the damping force variable valve assembly may be installed on a serial passage between the rebound chamber and the low-pressure chamber.

The additional valve may be an amplitude selective valve installed to control a flow of a working fluid from the rebound chamber to the damping force variable valve assembly according to an amplitude of a shock applied to the shock absorber.

The amplitude selective valve may include: an operating chamber which is formed inside a rod guide; a first passage which is formed in the rod guide to communicate the rebound chamber and the operating chamber with each other; a second passage formed in the rod guide to communicate with the high-pressure chamber and the operating chamber with each other; and a free piston which is installed to be vertically movable according to an amplitude within the operating chamber.

The free piston may be pressurized by a pressuring unit, so as to suppress a flow of a working fluid through the first passage and the second passage when no external force is applied to the shock absorber.

The additional valve may be one of a frequency selective valve capable of performing a frequency selective function of adjusting a damping force according to a frequency of an input shock, an amplitude selective valve capable of performing an amplitude selective function of adjusting a damping force according to an amplitude of an input shock, and an extremely-low-speed valve capable of generating a damping force when a working fluid inside the shock absorber flows at an extremely low speed.

DETAILED DESCRIPTION OF EXEMPLARY EMBODIMENTS

Hereinafter, a damping force variable shock absorber according to a preferred embodiment of the present invention will be described in detail with reference to the accompanying drawings.

The damping force variable shock absorber according to the present invention includes an additional valve installed inside a rod guide. The additional valve is separately installed so as to implement performance that could not be implemented by a main valve (for example, a piston valve, a body valve, a damping force variable valve assembly, or the like). Examples of the additional valve include a frequency selective valve capable of performing a frequency selective function of adjusting a damping force according to a frequency of an input shock, an amplitude selective valve capable of performing an amplitude selective function of adjusting a damping force according to an amplitude of an input shock, and an extremely-low-speed valve capable of generating a damping force when a working fluid inside the shock absorber flows at an extremely low speed.

Therefore, according to the present invention, in designing a damping force variable shock absorber, a damping force variable shock absorber with an additional function can be provided in such a manner that an additional valve having a function required according to a vehicle type to be applied is selectively mounted inside a rod guide.

Figure 1:
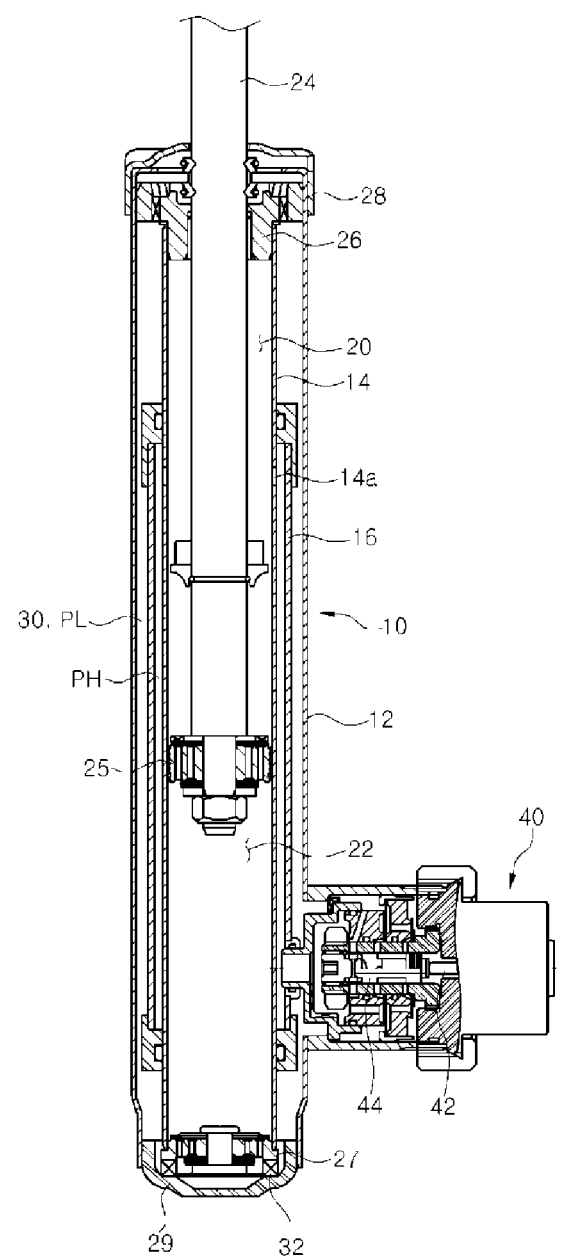
FIG. 1 is a sectional view illustrating an example of a conventional damping force variable shock absorber.
Figure 2:
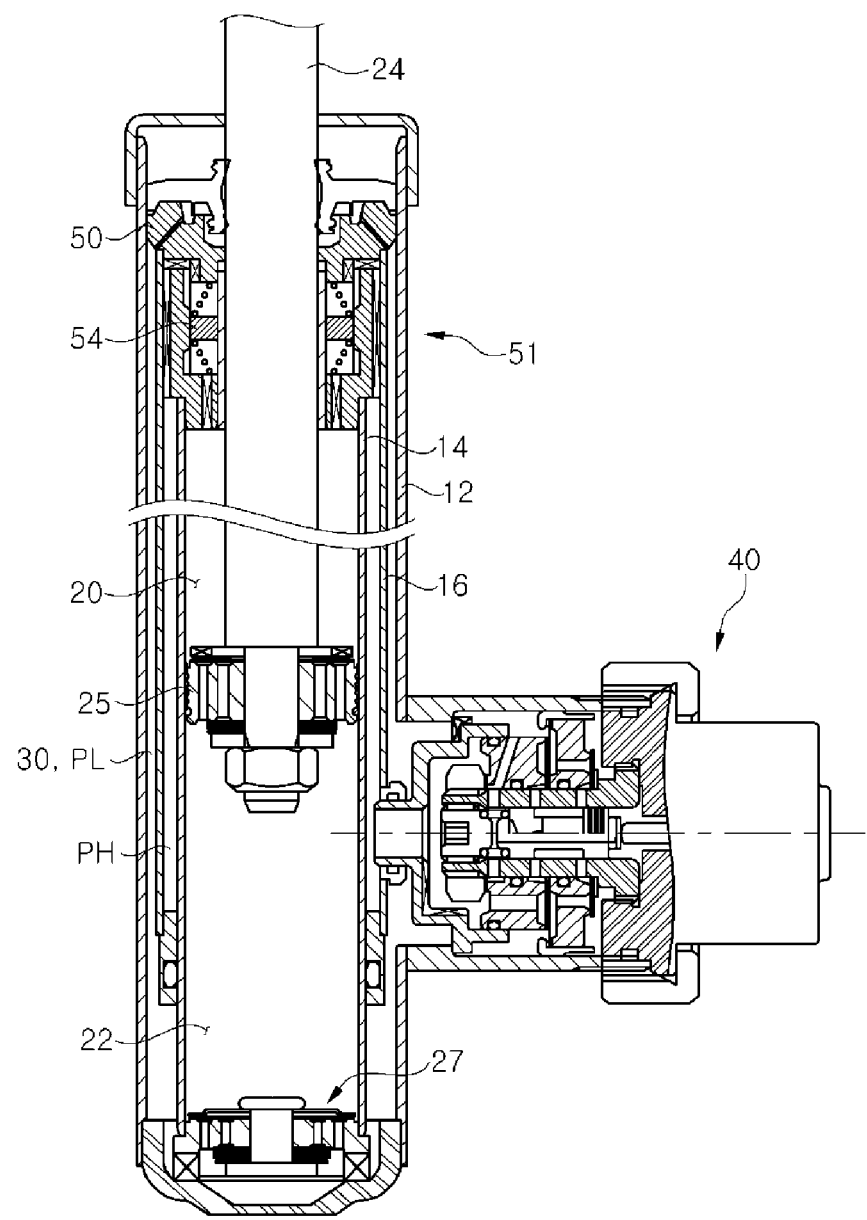
FIG. 2 is a sectional view illustrating a damping force variable shock absorber according to the present invention.
Figure 3A:
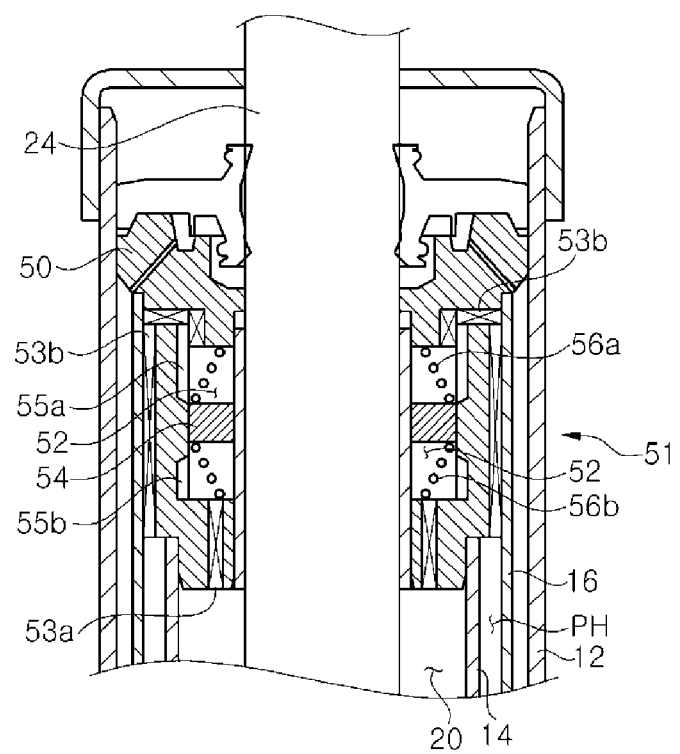
FIG. 3A is an enlarged sectional view of main parts of the damping force variable shock absorber according to the present invention, illustrating a state in which an additional valve does not operate.
Figure 3B:
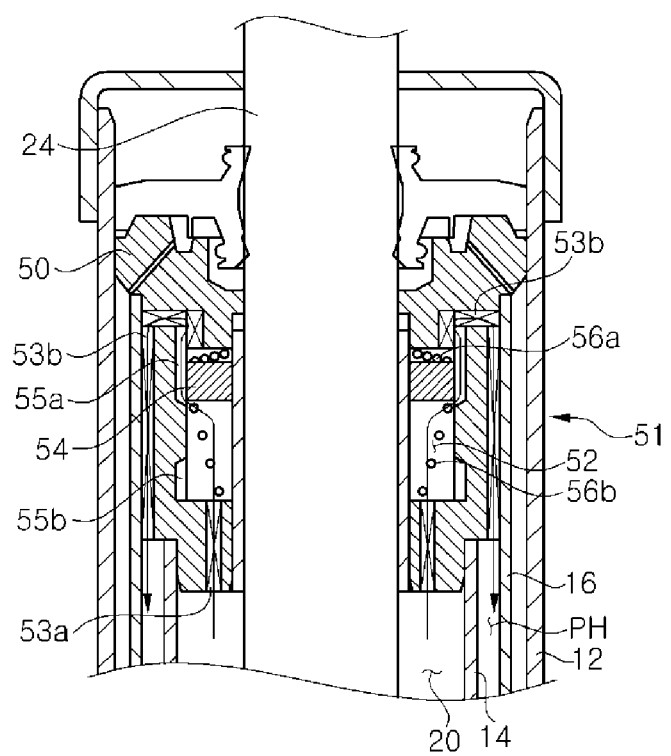
FIG. 3B is an enlarged sectional view of main parts of the damping force variable shock absorber according to the present invention, illustrating a state in which an additional valve operates.

As illustrated in FIGS. 2, 3A, and 3B, the damping force variable shock absorber according to the present invention includes an additional valve 51 installed inside the rod guide 50. In the following description given with reference to FIGS. 2 to 3B, the same reference numerals as those of FIG. 1 are used to refer to the same elements for convenience.

Similar to the conventional damping force variable shock absorber described with reference to FIG. 1, the damping force variable shock absorber according to the present invention includes a base shell 12 in which a damping force variable valve assembly 40 is attached to an outside, an inner tube 14 which is installed inside the base shell 12 and in which a piston rod 24 is installed to be movable in a length direction, a piston valve 25 connected to one end of the piston rod 24 to partition the internal space of the inner tube 14 into a rebound chamber 20 and a compression chamber 22, and a separator tube 16 installed to partition a space between the base shell 12 and the inner tube 14 into a high-pressure chamber PH and a low-pressure chamber PL serving as a reservoir chamber 30.

The rod guide 50 is connected to upper portions of the base shell 12, the inner tube 14, and the separator tube 16 to close respective upper openings.

As illustrated in FIG. 1, the conventional rebound chamber 20 communicates with the damping force variable valve assembly 40 through the inner hole 14a and the high-pressure chamber PH. However, as illustrated in FIGS. 2 to 3B, the rebound chamber 20 according to the present invention communicates with the damping force variable valve assembly 40 through the additional valve 51 and the high-pressure chamber PH.

In the damping force variable shock absorber according to the present invention, since the additional valve 51 such as a frequency selective valve, an amplitude selective valve, and an extremely-low-speed valve is installed, a designer can design the shock absorber to perform a desired additional function.

In the embodiment illustrated in FIGS. 2 to 3B, the amplitude sensitive valve is illustrated as the additional valve 51, but this is merely exemplary. According to the present invention, a valve implementing other function may be installed as the additional valve.

When an amplitude input from the outside is small, that is, when the amplitude selective valve cannot be opened because a frequency input to the shock absorber is high and a displacement is small, the amplitude selective valve installed as the additional valve 51 can suppress a flow of a working fluid between the rebound chamber 20 and the high-pressure chamber PH, thereby improving a ride comfort during driving on a road having an excellent road surface as in the case of driving on an expressway and during driving at a high speed.

The amplitude selective valve installed inside the rod guide 50 includes an operating chamber 52 formed inside the rod guide 50, a first passage 53a formed in the rod guide 50 to communicate the rebound chamber 20 and the operating chamber 52 with each other, a second passage 53b formed in the rod guide 50 to communicate with the high-pressure chamber PH and the operating chamber 52 with each other, and a free piston 54 installed to be vertically movable according to an amplitude within the operating chamber 52.

The free piston 54 is installed to open and close a passage between the rebound chamber 20 and the high-pressure chamber PH according to an amplitude of a shock applied to the shock absorber.

More specifically, an upper groove 55a and a lower groove 55b are formed respectively on upper and lower surfaces of the operating chamber 52 inside the rod guide, except for the central portion. In addition, the free piston 54 may be positioned in the central portion inside the operating chamber 52 when the free piston 54 is vertically supported by an upper spring 56a and a lower spring 56b and thus no external force is applied. Therefore, when no external force is applied, that is, when an amplitude of a shock is small or no shock is applied, the free piston 54 is positioned in the central portion to limit the flow of the working fluid.

A band having a small friction coefficient, such as Teflon, may be attached to an inner peripheral surface of the rod guide 50 so as to reduce a frictional force when the piston rod is vertically moved.

The upper spring 56a and the lower spring 56b may be mounted in mounting surfaces formed on the upper and lower surfaces of the free piston 54, respectively. Although not illustrated, mounting grooves may be formed in the mounting surfaces so as to prevent horizontal shaking of the springs.

When the free piston 54 is moved with a large amplitude by an input shock and thus the passage is opened, the working fluid inside the rebound chamber 20 may sequentially pass through a flow path including the first passage 53a, the operating chamber 52, the upper groove 55a, and the second passage 53b, which are formed in the rod guide 50, and flow into the high-pressure chamber PH.

Hereinafter, the operation of the additional valve installed in the damping force variable shock absorber according to the present invention will be described with reference to FIGS. 3A and 3B.

FIG. 3A illustrates a state in which the additional valve does not operate when a small-amplitude road surface is input to the damping force variable shock absorber according to the present invention.

In the case of a high-speed driving on an expressway having an excellent road surface, a high-frequency small-amplitude vibration may be input to the shock absorber. Since the additional valve of the present invention, that is, the free piston 54 included in the amplitude selective valve, is supported by the upper spring 56a and the lower spring 56b, the working fluid inside the rebound chamber 20 cannot flow into the high-pressure chamber PH until before an external force stronger than a resistance of the springs is input.

FIG. 3B illustrates a state in which the additional valve operates when a large-amplitude road surface is input to the damping force variable shock absorber according to the present invention.

In the case of driving on a road with a poor road surface or passing over a bump, a low-frequency large-amplitude vibration may be input to the shock absorber. The additional valve of the present invention, for example, the free piston 54 included in the amplitude selective valve, is vertically supported by the upper spring 56a and the lower spring 56b. Therefore, when a low-frequency large-amplitude vibration greater than a resistance of the springs is input, the free piston 54 may move while compressing the upper spring 56a or the lower spring 56b, and thus, the passage between the rebound chamber 20 and the high-pressure chamber PH may be opened.

When the passage is opened, the working fluid inside the rebound chamber 20 may flow into the high-pressure chamber PH. When the passage is opened, the springs do not affect the damping force any more. In this case, the damping force generated in the shock absorber is controlled by the piston valve 25, the body valve 27, and the damping force variable valve assembly 40.

FIG. 3B illustrates a state in which the free piston 54 moves upward while compressing the upper spring 56a within the operating chamber 52 and thus the passage is opened. At this time, the working fluid inside the rebound chamber 20 may pass through the opened passage, including the first passage 53a, the operating chamber 52, the upper groove 55a, and the second passage 53b which are formed in the rod guide 50, and then, flow into the high-pressure chamber PH.

Figure 4:
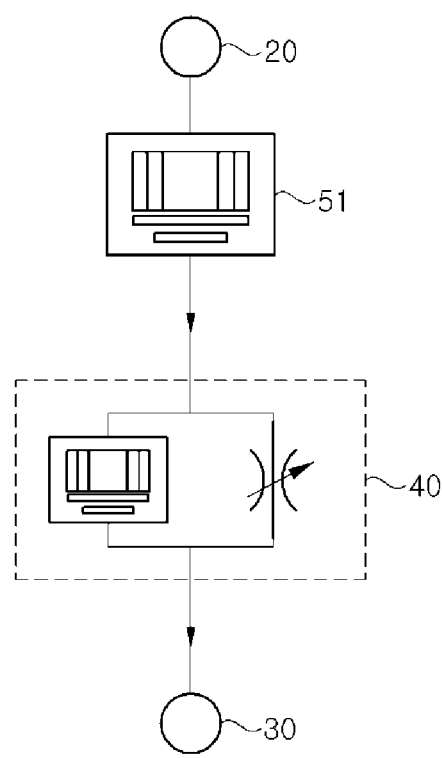
FIG. 4 is a conceptual diagram illustrating a passage relationship between a damping force variable valve and an additional valve.

As illustrated in FIG. 4, according to the damping force variable shock absorber of the present invention, during the extension of the piston rod, the working fluid inside the rebound chamber 20 sequentially passes through the additional valve 51 and the damping force variable valve assembly 40 and then flows into the reservoir chamber 30. More specifically, the working fluid having passed the additional valve 51 flows into the damping force variable valve assembly 40 through the high-pressure chamber PH, and the working fluid having passed the damping force variable valve assembly 40 flows into the reservoir chamber 30 and then flows into the compression chamber 22 through the body valve 27.

As such, since the additional valve 51 and the damping force variable valve assembly 40 are connected through a serial passage, the working fluid can flow into the damping force variable valve assembly 40 when the additional valve 51 is fully opened. Therefore, according to the present invention, the additional valve 51 can prevent adverse effect on the damping force varying function of the damping force variable valve assembly 40.

As described above, according to the present invention, it is possible to provide the damping force variable shock absorber in which the additional valve is selectively mounted for providing the frequency or amplitude selective function, which could not be implemented by the conventional damping force variable shock absorber, or generating the damping force at the time of the extremely low speed.

According to the damping force variable shock absorber of the present invention, since the additional valve and the damping force variable valve are installed on the serial passage, the additional valve can be used without affecting the operation of the damping force variable valve.

Moreover, according to the damping force variable shock absorber of the present invention, since the additional valve is installed inside the rod guide, the spatial limitation can be solved.

While the embodiments of the present invention have been described with reference to the specific embodiments, it will be apparent to those skilled in the art that various changes and modifications may be made without departing from the spirit and scope of the invention as defined in the following claims.

| DESCRIPTION OF REFERENCE NUMERALS | |
|---|---|
| 12: base shell | 14: inner tube |
| 16: separator tube | 20: rebound chamber |
| 22: compression chamber | 24: piston rod |
| 25: piston valve | 30: reservoir chamber |
| 40: damping force variable valve assembly | 50: rod guide |
| 51: additional valve | 52: operating chamber |
| 53a: first passage | 53b: second passage |
| 54: free piston | 55a: upper groove |

-continued

DESCRIPTION OF REFERENCE NUMERALS

| | |
|---|---|
| 55b: lower groove | 56a: upper spring |
| 56b: lower spring | PL: low-pressure chamber |
| PH: high-pressure chamber | |

What is claimed is:

1. A damping force variable shock absorber comprising:
a base shell having an upper opening;
a damping force variable valve assembly attached to an outside of the base shell;
an inner tube within the base shell;
a piston rod within the inner tube, the piston rod being movable in a length direction of the inner tube;
a piston valve connected to one end of the piston rod, wherein the piston valve partitions an internal space of the inner tube into a rebound chamber and a compression chamber;
a separator tube within a space between the inside of the base shell and the inner tube, wherein the separator tube partitions the space between the inside of the base shell and the inner tube into a low-pressure chamber and a high-pressure chamber;
a rod guide, the upper opening of the base shell being closed by the rod guide; and
an amplitude selective valve inside the rod guide, the amplitude selective valve comprising:
an operating chamber within the rod guide;
a first passage within the rod guide, the rebound chamber being communicatively coupled with the operating chamber by way of the first passage;
a second passage within the rod guide, the high-pressure chamber being communicatively coupled with the operating chamber by way of the second passage; and
a free piston within the operating chamber, the free piston being movable in the length direction of the inner tube based on an amplitude of an input shock,
wherein the amplitude selective valve and the damping force variable valve assembly are installed on a serial passage between the rebound chamber and the low-pressure chamber.

2. The damping force variable shock absorber according to claim 1,
wherein the amplitude selective valve further includes an upper spring and an lower spring to support the free piston.

3. The damping force variable shock absorber according to claim 2, wherein the upper spring and the lower spring are configured to support the free piston in a central portion of the operating chamber to limit a flow of a working fluid, when no input shock is applied.

4. The damping force variable shock absorber according to claim 2, wherein upper spring and the lower spring are mounted in mounting grooves on the free piston.

5. A damping force variable shock absorber comprising:
a base shell having an upper opening;
a damping force variable valve assembly attached to an outside of the base shell;
an inner tube within the base shell;
a piston rod within the inner tube, the piston rod being movable in a length direction of the inner tube;
a piston valve connected to one end of the piston rod, an internal space of the inner tube being partitioned into a rebound chamber and a compression chamber by the piston valve;
a separator tube within a space between the inside of the base shell and the inner tube, wherein the separator tube partitions the space between the inside of the base shell and the inner tube into a low-pressure chamber and a high-pressure chamber; and
a rod guide, within the base shell, the upper opening of the base shell being closed by the rod guide; and
a frequency selective valve inside the rod guide, the frequency selective valve being configured to adjust a damping force based on a frequency of an input shock,
wherein the frequency selective valve and the damping force variable valve assembly are installed on a serial passage between the rebound chamber and the low-pressure chamber.

* * * * *